United States Patent [19]

Agata et al.

[11] 3,853,871

[45] Dec. 10, 1974

[54] PROCESS FOR PRODUCING PYRIMIDINE DERIVATIVES

[75] Inventors: Isao Agata; Shunsaku Noguchi; Kunihiro Tanaka, all of Osaka, Japan

[73] Assignee: Chinoin Pharmaceutical and Chemical Works Ltd., Budapest, Hungary

[22] Filed: Sept. 7, 1972

[21] Appl. No.: 287,026

[30] Foreign Application Priority Data
Sept. 10, 1971 Japan.............................. 46-70682

[52] U.S. Cl. .... 260/251 A, 260/239 B, 260/239 BE, 260/256.4 Q, 260/293.87, 260/294.9, 260/295 R, 260/326.5 L, 260/326.62, 424/251
[51] Int. Cl............................................. C07d 51/46
[58] Field of Search................. 260/251 A, 256.4 Q

[56] References Cited
UNITED STATES PATENTS
3,483,200   12/1969   Carney et al. .................... 260/247.5
FOREIGN PATENTS OR APPLICATIONS
1,209,946   10/1970   Great Britain

*Primary Examiner*—G. Thomas Todd
*Attorney, Agent, or Firm*—Wenderoth, Lind & Ponack

[57] ABSTRACT
Compounds of the formula

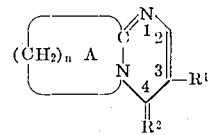

wherein $R^1$ is CN or an alkoxycarbonyl group, $R^2$ is NH or an oxo group, $n$ is an integer of from 3 to 6 inclusive and the ring A may be substituted by lower alkyl or phenyl are produced by reacting a compound of the formula

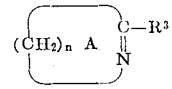

wherein $R^3$ is an alkoxyl or amino group and n and ring A are as defined above with a compound of the formula

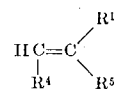

wherein $R^4$ is an alkoxyl or amino group, $R^5$ is CN or an alkoxycarbonyl group and $R^1$ is as defined above. When $R^3$ and $R^4$ are both alkoxy the reaction is conducted in the presence of ammonia or an ammonia-producing substance. When $R^1$ and $R^5$ are both CN, $R^2$ is NH. When one of $R^1$ and $R^5$ is CN and the other is an alkoxycarbonyl group, $R^2$ is an oxo group. The compounds are useful as analgesics, antipyretics and antiinflammatories. The compounds where $n$ is 3, 5 or 6 are novel.

4 Claims, No Drawings

PROCESS FOR PRODUCING PYRIMIDINE DERIVATIVES

This invention relates to a novel and industrially useful process for producing compounds of the formula

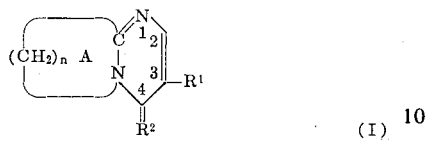

(I)

wherein $R^1$ is CN or an alkoxycarbonyl group, $R^2$ is NH or an oxo group, $n$ is an integer of from 3 to 6 inclusive and the ring A may have as a substituent a lower alkyl or phenyl group. The compounds are useful as analgesics, antipyretics and antiinflammatories.

Among the compounds (I), those wherein $n$ is other than 4 are novel compounds. Among those wherein $n$ is 4, some compounds have been known and a typical example of their preparation is schematically shown below:

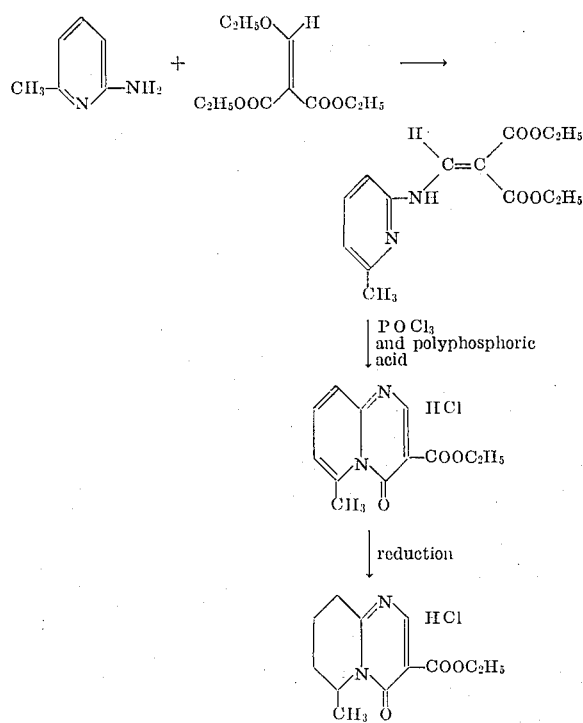

As shown, the known process requires employment of phosphorusoxychloride and polyphosphoric acid for the cyclization reaction. This makes it inconvenient not only to conduct the reaction smoothly due to formation of hydrogen chloride but also to separate the cyclized product.

Further, the known process cannot be applied for preparation of those compounds (I) wherein $n$ is other than 4.

A principal object of the present invention is to provide a process for preparation of the compounds (I), which can produce not only those compounds (I) wherein $n$ is 4 but also those compounds (I) wherein $n$ is 3,5 and 6 without causing any inconveniences in the known process.

A further object of the invention is to provide the compounds (I) wherein $n$ is other than 4.

The present process comprises reacting a compound of the formula

(II)

wherein $R^3$ is an alkoxyl or amino group and n has the same meaning as defined above and the ring A may have a lower alkyl, or phenyl substituent with a compound of the formula $$HC=C\begin{matrix}R^1\\R^4\end{matrix}\begin{matrix}\\R^5\end{matrix}$$

(III)

wherein $R^4$ is an amino group or an alkoxyl group, $R^5$ is CN or an alkoxycarbonyl gropu and $R^1$ has the same meaning as defined above, if necessary, in the presence of ammonia or ammonia-producing substance.

Examples of the alkoxycarbonyl group represented by $R^1$ or $R^5$ include lower alkoxycarbonyl, e.g., methoxycarbonyl, ethoxycarbonyl, propoxycarbonyl and iso-propoxycarbonyl group.

Examples of an alkoxyl group represented by $R^3$ or $R^4$ include lower alkoxyl, e.g., methoxy, ethoxy and propoxy.

Examples of the lower alkyl group which can be a substituent on the ring A include methyl, ethyl, propyl and isopropyl group.

The symbol $R^2$ is NH only in cases where $R^1=R^5=CN$. Where one or both of $R^1$ and $R^5$ is alkoxycarbonyl, $R^2$ is an oxo group. Thus, where either of $R^1$ and $R^5$ is CN and the other is alkoxycarbonyl, $R^1$ is CN.

In the present process, the compound (II) is allowed to react with the compound (III), if necessary, in the presence of ammonia or ammonia-producing substance.

The present process is conducted in the presence of ammonia or ammonia-producing substance when neither $R^3$ nor $R^4$ is amino group. In the case where at least either of $R^3$ and $R^4$ is amino group, the present process may be conducted in the absence of ammonia or ammonia-producing substance.

The ammonia-producing substance is exemplified by an amide (e.g. formamide) or an organic or inorganic ammonium salt (e.g. ammonium chloride, ammonium sulfate, ammonium acetate or ammonium formate). The amount of the ammonia or the ammonia-producing substance employed is, for example, from 1 mol to about 10 mols per mol of the compound (II).

The amount of the compound (II) employed is generally about equimol of the compound (III). The reaction temperature is generally and suitably selected from the range of from about 5°C to about 180°C. The present reaction proceeds in the presence or absence of a solvent. Examples of the solvent include water, alcohol (e.g. methanol or ethanol) or those diluted with water, aromatic hydrocarbon (e.g. benzene, toluene or xylene), aromatic hydrocarbon containing halogen or nitro group (e.g. chlorobenzene, dichlorobenzene, trichlorobenzene or nitrobenzene), ether (e.g. tetrahydrofuran or diglyme) and cyclic amine (e.g. pyridine).

The present reaction may be accelerated by the addition of a catalytic amount of an organic acid (e.g., acetic acid or propionic acid).

In the case where either or both of $R^3$ and $R^4$ are amino group, the reaction may be accelerated by the addition of an alkali substance, which may be exemplified by alkalialcoholate (e.g. sodium methoxide or sodium ethoxide), alkali hydroxide (e.g. sodium hydroxide or potassium hydroxide) or alkali carbonate (e.g. sodium carbonate, potassium carbonate, sodium bicarbonate or potassium bicarbonate). In the present reaction, an intermediate of the formula

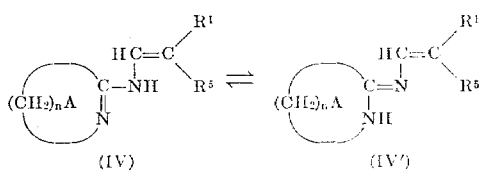

(wherein all the symbols have the same meanings as defined above) is produced. The present process can be conducted with or without isolation of the intermediate.

The intermediate can be converted into the compound (I) under heating at a suitable temperature between about 100°C and 200°C.

The compound (I) prepared by the present process can be isolated by per se conventional procedures, for example, by removing the solvent from the resulting reaction mixture and can be further purified by per se conventional purification procedures, for instance, by column chromatography, extraction with a suitable solvent, distillation or recrystallization.

The compound (I) can be converted into an acid addition salt by per se conventional procedure with an inorganic acid (e.g. hydrochloric acid, sulfuric acid, nitric acid or phosphoric acid) or an organic acid (e.g. oxalic acid, citric acid, malic acid, maleic acid, succinic acid or acetic acid).

The compound (I) or its acid addition salt can be converted into a quaternary ammonium salt on the nitrogen at the 1-position with an alkylating agent such as alkyl sulfate (e.g. dimethyl sulfate or diethyl sulfate), an alkyl halide (e.g. methyl idoide, methyl bromide, ethyl iodide or ethyl bromide) or an aralkylating agent (e.g. benzyl bromide, benzyl chloride or phenethyl bromide). The reaction conditions for preparation of the quaternary ammonium salt are selected suitably from those conventional ones.

For purposes of this invention the acid addition and quaternary ammonium salts are deemed to be the full equivalents of the compounds.

The alkoxycarbonyl group represented by $R^1$ of the compound (I) can be converted into a free carboxyl group by per se conventional hydrolysis and also converted into carbamoyl group by per se conventional amidation.

The compounds (I), their acid addition salts and quaternary ammonium salts of those compounds are useful for analgesics, antipyretics and antiinflammatories.

Those compounds can be administered in a conventional pharmaceutical composition such as powder, granule, tablets or injection. Although dosage of those compounds vary with the kind of the compounds, kind or severity of the diseases to be treated, etc., it may be suitably selected from the range of about 0.1g. to about 10g. per day for adult human in a case of oral administration and from the range of about 1 mg. to about 1000 mg. per day for adult human in a case of parenteral administration.

EXAMPLE 1

In 100 ml. of ethanol is dissolved 2.3 g. of metallic sodium and 17 g. of acetic acid salt of 7-amino-3,4,5,6-tetrahydro-2H-azepine is added at 4°C. The mixture is stirred for 30 minutes and 21 g. of ethyl ethoxymethylenemalonate is added below 6°C. The mixture is stirred under cooling with ice-water for 30 minutes and is refluxed for 1 hour. After evaporation of the solvent, water is added to the residue and the mixture is extracted with chloroform. The chloroform layer is washed with water, and the solvent is evaporated in vacuo. The residue is dissolved in ether and extracted with 3% hydrochloric acid. The aqueous layer is washed with ether, made alkaline with sodium carbonate and extracted with chloroform. The organic layer is dried over anhydrous sodium sulfate, filtered and concentrated to give 14 g. of crystals. Recrystallization from a mixture of ethanol and ether gives 5.35 g. of 3-ethoxycarbonyl-7,8,9,10-tetrahydro-pyrimido-[1,280°—azepin-4(6H)-one melting at 80–82° C. From the mother liquor 7.50 g. of the crystal is obtained.

Elemental analysis: $C_{12}H_{16}N_2O_3$;
Calculated: C 61.00, H 6.83, N 11.86;
Found: C61.01, H 6.96, N 11.89.
Infrared spectrum (in $CHCl_3$):
1730cm$^{-1}$(carbonyl of ester)
1680–1705cm$^{-1}$(carbonyl of amide)
Nuclear magnetic resonance spectrum (100mc in $CDCl_3$):
1.36(3H t J=7cps) $CH_3—CH_2—$
1.83(6H br.s) $—CH_2—CH_2—CH_2—CH_2—CH_2—$
3.0(2H)

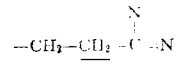

4.2(2H) $—CH_2—CH_2—N$
4.30(2H, q, J=7cps) $CH_3—CH_2—O$
4.48(1H,s)

EXAMPLE 2

A mixture of 12.7 g. of 0-methylcaprolactim, 21 g. of ethyl ethoxymethylenemalonate and 8 g. of ammonium acetate is refluxed for 7.5 hours and the solvent is evaporated in vacuo. The residue is dissolved in 6% hydrochloric acid, washed with ether, made alkaline with sodium carbonate and extracted with ether. The ether layer is dried over anhydrous sodium sulfate and the solvent is removed in vacuo to give 10.52 g. of crystal. Recrystallization from a mixture of acetone and ether gives 7.35 g. of 3-ethoxycarbonyl-7,8,9,10-tetrahydro-pyrimido-[1,2a]-azepin-4(6H)-one.

EXAMPLE 3

To a solution of 1.27 g. of 0-methylcaprolactim and 2.2 g. of ethyl ethoxymethylenemalonate in 5 ml. of diglyme is added 0.8 g. of ammonium acetate and the mixture is heated at 170°–190°C in a sealed tube for 10 hours. The reaction mixture is made alkaline with aqueous sodium carbonate solution and extracted with chloroform. The chloroform layer is washed with water and dried over anhydrous sodium sulfate and the solvent is removed in vacuo to give 1 g. of 3-ethoxycarbonyl-7,8,9,10-tetrahydro-pyrimido-[1,2a]-azepin-4(6H)-one.

EXAMPLE 4

To a solution of 1.27 g. of 0-methylcaprolactim and 2.2 g. of ethyl ethoxymethylenemalonate in 5 ml. of methanol is added 0.8 g. of ammonium acetate and the mixture is heated at 100°–120°C in a sealed tube for 11 hours and the solvent is removed in vacuo. The residue is made alkaline with aqueous sodium carbonate solution and extracted with chloroform. The chloroform layer is dried over anhydrous sodium sulfate and the solvent is removed in vacuo. The residue and 5 ml. of dichlorobenzene are heated at 170°–190°C in a sealed tube for 10 hours and the solvent is removed in vacuo. The residue is dissolved in 3% hydrochloric acid. The aqueous layer is washed with ether, made alkaline with sodium carbonate and extracted with ether. The ether layer is washed with water, dried over anhydrous sodium sulfate and the solvent is removed in vacuo to give 1.17 g. of 3-ethoxycarbonyl-7,8,9,10-tetrahydro-pyrimido-[1,2a]-azepin-4(6H)-one.

EXAMPLE 5

Into a solution of 1.3 g. of 0-methylcaprolactim and 2.2 g. of ethyl ethoxymethylenemalonate in 3 ml. of ethanol is introduced ammonia gas under cooling for 10 minutes. The mixture is refluxed for 1 hour and heated at 125°–145°C in a sealed tube for 5 hours. The solvent is removed in vacuo and the residue is dissolved in 3% hydrochloric acid and washed with ether. The aqueous layer is made alkaline with sodium carbonate and extracted with ether. The ether extract is dried over anhydrous sodium sulfate and the solvent is removed in vacuo to give 0.57 g. of 3-ethoxycarbonyl-7,8,9,10-tetrahydropyrimido-[1,2a]-azepin-4(6H)-one.

EXAMPLE 6

To a solution of 1.3 g. of 0-methylcaprolactim and 2.1 g. of ethyl ethoxymethylenemalonate in 5 ml. of ethanol is added under cooling with ice 0.2 g. of ferric chloride and subsequently introduced ammonia gas for 10 minutes. The mixture is refluxed for 8 hours and worked up in a manner similar as described above to give 0.3 g. of 3-ethoxycarbonyl-7,8,9,10-tetrahydropyrimido-[4,2a]-azepin-4(6H)-one.

EXAMPLE 7

A solution of 11 g. of 0-methylcaprolactim and 12 g. of ethyl aminomethylenemalonate in 33 ml. of methanol and 4.6 g. of propionic acid is refluxed for 17 hours. The reaction mixture is worked up in a manner similar as described above to give 3.9 g. of 3-ethoxycarbonyl-7,8,9,10-tetrahydro-pyrimido-[1,2a]-azepin-4(6H)-one.

EXAMPLE 8

A mixture of 1.3 g. of 0-methylcaprolactim, 1.8 g. of ethyl aminomethylenemalonate and 5 ml. of ethanol is refluxed for 22 hours. The reaction mixture is worked up in a manner similar as described above to give 0.78 g. of 3-ethoxycarbonyl-7,8,9,10-tetrahydro-pyrimido-[1,2a]-azepin-4(6H)-one.

EXAMPLE 9

A solution of 4.8 g. of 0-methylcaprolactim and 5.4 g. of ethyl aminomethylenemalonate in 5 ml. of ethanol is heated at 130°–150°C in a sealed tube for 10 hours. The reaction mixture is worked up in a manner similar as described above to give 3.4 g. of 3-ethoxycarbonyl-7,8,9,10-tetrahydro-pyrimido-[1,2a]-azepin-4(6H)-one.

EXAMPLE 10

A mixture of 0.6 g. of 7-amino-3,4,5,6-tetrahydro-2H-azepine, 1 g. of ethyl ethoxymethylenemalonate and 5 ml. of ethanol is heated at 120°–140°C in a sealed tube for 10 hours. The reaction mixtue is worked up in a manner similar as described above to give 0.3 g. of 3-ethoxycarbonyl-7,8,9,10-tetrahydro-pyrimido-[1,2a]-azepin-4(6H)-one.

EXAMPLE 11

To a solution of 1.7 g. of acetic acid salt of 7-amino-3,4,5,6-tetrahydro-2H-azepin in 20 ml. of 95% ethanol is added below 10°C a solution of 0.4 g. of sodium hydroxide in 1 ml. of water and 10 ml. of 95% ethanol. To the mixture is further added 2.1 g. of ethyl ethoxymethylenemalonate below 10°C. The mixture is stirred below 10°C for 2 hours and further stirred at room temperature for 3 hours. The solvent is removed in vacuo and the residue is worked up in a similar manner as described above to give 0.64 g. of 3-ethoxycarbonyl-7,8,9,10-tetrahydro-pyrimido-[1,2a]-azepin-4(6H)-one.

EXAMPLE 12

To a solution of 3.4 g. of acetic acid salt of 7-amino-3,4,5,6-tetrahydro-2H-azepine in 20 ml. of water which is cooled at 4°C, is added a solution of 1.1 g. of potassium hydroxide in 10 ml. of water so as to keep the temperature below 10°C. The mixture is stirred for 20 minutes and 4.2 g. of ethyl ethoxymethylenemalonate is added, so as to keep the temperature below 10°C. The mixture is stirred for 1 hour and left standing at room temperature overnight. The mixture is extracted with ether and the ether is removed in vacuo. The residue is crystallized from ether to give 0.75 g. of 3-ethoxycarbonyl-7,8,9,10-tetrahydro-pyrimido-[1,2a]-azepin-4(6H)-one.

EXAMPLE 13

In 100 ml. of ethanol is dissolved 1.15 g. of metallic sodium, followed by addition of 8.6 g. of acetic acid salt of 7-amino-3,4,5,6-tetrahydro-2H-azepine under cooling at 4°C. The mixture is stirred for 30 minutes and a solution of 8.5 g. of ethyl ethoxymethylenecyanoacetate in 30 ml. of ethanol is added so as to keep the temperature below 8°C. The mixture is stirred for 1 hour and refluxed for further 1 hour. The solvent is removed in vacuo and water is added. The mixture is extracted with chloroform. The chloroform extract is washed with a saturated sodium chloride solution and the solvent is removed in vacuo. To this residue is added 3% hydrochloric acid and the mixture is extracted with ether. The ether layer is dried over anhydrous sodium sulfate and the solvent is removed in vacuo. The residue is recrystallized from acetone to give 0.6 g. of 3-cyano-7,8,9,10-tetrahydropyrimido-[1,2a]-azepin-4(6H)-one.

The 3% hydrochloric acid layer obtained above is made alkaline with sodium carbonate and extracted with ether. The ether layer is dried over anhydrous sodium sulfate and concentrated to give 8.33 g. of ethyl N(3,4,5,6-tetrahydro-2H-azepin-7-yl)-methylenecyanoacetate. 6.6 g. of the compound obtained is heated at 130°–140°C for 5.5 hours and the product is extracted with ether. The ether is removed and the residue is crystallized from ether to give 1 g. of 3-cyano-7,8,9,10-tetrahydropyrimido-[1,2a]-azepin-4(6H)-one.

Elemental analysis: $C_{10}H_{11}N_3O$;
Calculated: C 63.47, H 5.86, N 22.21;
Found: C 63.68, H 5.84, N 22.39.

Infrared spectrum (in $CHCl_3$)
2230cm$^{-1}$(nitril)
1680cm$^{-1}$(carbonyl of amide)

Nuclear magnetic resonance spectrum (100mc, in $CDCl_3$)

1.86 (6H br.s) —$CH_2$—$CH_2$—$CH_2$—$CH_2$—$CH_2$—
3.1 (2H)

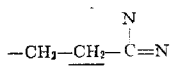

4.3 (2H) —$CH_2$—$CH_2$—N
8.17 (1H)

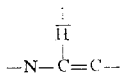

EXAMPLE 14

In 50 ml. of ethanol is dissolved 1.38 g. of metallic sodium followed by addition of 8.5 g. of acetic acid salt of 7-amino-3,4,5,6-tetrahydro-2H-azepine under cooling with ice. The mixture is stirred for 1 hour and a solution of 8.5 g. of ethyl ethoxymethylenecyanoacetate in 50 ml. of ethanol is added below 10°C. The mixture is cooled to 4°C and stirred at the temperature for 1 hour, further stirred at room temperature for 1 hour and refluxed for 3 hours. The solvent is removed in vacuo and the residue is shaken with a mixture of water and chloroform. The chloroform layer is dried over anhydrous sodium sulfate and the solvent is removed in vacuo. The residue is dried over phosphoruus pentaoxide in vacuo and the resulting crystals are taken by filtration. Ether is added to the filtrate and the resulting crystals are taken by filtration. The crystals are combined and recrystallized from ether to give 3.44 g. of 3-cyano-7,8,9,10-tetrahydropyrimido-[1,2a]-azepin-4(6H)-one.

EXAMPLE 15

A mixture of 10 g. of 2-methoxy-1-pyrroline, 21 g. of ethyl ethoxymethylenemalonate and 7.7 g. of ammonium acetate is refluxed for 8 hours. The reaction mixture is concentrated and the residue is dissolved in 6% hydrochloric acid. The solution is washed with ether, made alkaline with sodium carbonate and extracted with chloroform. The chloroform extract is dried over anhydrous sodium sulfate and the solvent is removed in vacuo. A mixture of acetone and ether is added to the residue and the mixture is cooled with dryice-acetone. The resulting crystals, which are very hygroscopic, are recrystallized in this manner to give 1.5 g. of 3-carboethoxy-4,6,7,8-tetrahydro-pyrro-[1,2a]-pyrimidin-4-one.

Elemental analysis: $C_{10}H_{12}N_2O_3$;
Calculated: C 57.68, H 5.81, N 13.46;
Found: C 56.80, H 5.99, N 13.50.

Infrared spectrum
1730cm$^{-1}$(carbonyl of ester)
1705-1670cm$^{-1}$(carbonyl of amide)

Nuclear magnetic resonance spectrum 1.41 (t,J=7cps) $CH_3$—$CH_2$—
2.30 (,J=7cps) —$CH_2$—$CH_2$—$CH_2$—
3.21 (t.J=7cps)

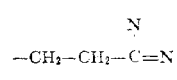

4.18 (t,J=7cps) —$CH_2$—$CH_2$—N
4.32 (q,J=7cps) O—$CH_2$—$CH_3$
8.58 (s)

EXAMPLE 16

In 1 ml. of benzene is dissolved 1 g. of 3-ethoxycarbonyl-7,8,9,10-tetrahydropyrimido-[1,2a]-azepin-4(6H)-one and 0.44 ml. of dimethyl sulfate is added. The mixture is refluxed for 15 minutes and concentrated to dryness The residue is dried well and dissolved in methylene chloride and the solution is filtered. Ether is added to the filtrate and the resulting precipitate is recrystallized from methylene chloride to give 0.7 g. of methyl sulfate salt of 1-methyl-3-ethoxycarbonyl-7,8,9,10-tetrahydro-pyrimido-[1,2a]-azepin-4(6H)-one which is very hygroscopic.

Elemental analysis $C_{14}H_{22}N_2O_7S$;
Calculated: C 46.41, H 6.12, N 7.73;
Found: C 46.07, H 6.08, N 7.36.

Nuclear magnetic resonance spectrum (in $CDCl_3$)
1.3 (3H, J=7cps)
1.9 (6H) $CH_2$-$CH_2$-$CH_2$-$CH_2$-$CH_2$
3.3 (2H)

3.4 (3H) $CH_3$—N
4.0 (3H) $CH_3$—$SO_4$
4.3 (2H) —O—$CH_2$—$CH_3$
4.5 (2H) —$CH_2$—N—
8.4 (1H)

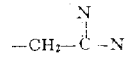

EXAMPLE 17

A mixture of 1.27 g. of 2-ethoxy-3,4,5,6-tetrahydropyridine, 3.24 g. of ethyl ethoxymethylenemalonate and 1.15 g. of ammonium acetate is refluxed for 8.5 hours. The reaction mixture is concentrated and the residue is dissolved in 6% hydrochloric acid. The solution is washed with ether, made alkaline with sodium carbonate and extracted with ether. The ether layer is dried over anhydrous sodium sulfate and the solvent is removed in vacuo. The residue is recrystallized from acetone-ether to give 0.2 g. of 3-ethoxycarbonyl-4-oxo-6,7,8,9-tetrahydro-4H-pyrido-[1,2a]-pyrimidine melting at 130°-133°C.

Elemental analysis: $C_{11}H_{14}N_2O_3$;
Calculated: C 59.45, H 6.35, N 12.60;
Found: C 59.38, H 6.30, N 12.54.

Infrared spectrum

1740cm⁻¹(carbonyl of ester)
1700cm⁻¹(carbonyl of amide)
Nuclear magnetic resonance spectrum(in CDCl₃)
0.8 (3H, J=7cps) CH₃—CH₂—
2.0 (4H) CH₂—CH₂—CH₂—CH₂—
2.9 (2H)

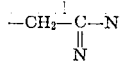

4.0 (2H) —CH₂—N
4.4 (2H, J=7cps) CH₃—CH₂—O—
8.6 (1H)

EXAMPLE 18

Into a mixture of 1.3 g. of 0-methylcaprolactim, 2.1 g. of ethyl ethoxymethylenemalonate, 0.8 g. of ammonium acetate and 3 ml. of ethanol is introduced ammonia gas under cooling with ice, followed by addition of 2 ml. of ethanol. The mixture is refluxed for 29 hours. The solvent is removed in vacuo and the residue is dissolved in ether. The ether solution is extracted with 3% hydrochloric acid. The aqueous layer is washed with ether, made alkaline with sodium carbonate and extracted with ether. The solvent is removed and the residue is recrystallized from ether to give 0.16 g. of 3-ethoxycarbonyl-7,8,9,10-tetrahydro-pyrimido[1,2a]-azepin-4(6H)-one.

EXAMPLE 19

In 100 ml. of ethanol is dissolved 1.38 g. of metallic sodium, followed by addition of 8.5 g. of acetic acid salt of 7-amino-3,4,5,6-tetrahydro-2H-azepine under cooling. The mixture is stirred at room temperature for 1 hour and a solution of 6.2 g. of ethoxymethylenemalononitril in 50 ml. of ethanol is dropwisely added below 10°C. The mixture is stirred at room temperature for 1 hour and refluxed for 3 hours. The solvent is removed in vacuo and the residue is shaken in a mixture of water and chloroform. The organic layer is washed with water, dried over anhydrous sodium sulfate, and the solvent is removed in vacuo. The residue is extracted with benzene and the solvent is removed in vacuo, and the residue is extracted again with ether. The residue is recrystallized from ether to give 0.77 g. of crystals. The crystals are recrystallized from ether to give 0.25 g. of 3-cyano-4-imino-7,8,9,10-tetrahydro-4H,6H-pyrimido[1,2a]-azepine.
Elemental analysis: C₁₀H₁₂N₄;
Calculated: C 63.81, H 6.43, N 29.77;
Found: C 63.90, H 6.52, N 29.59.
Infrared spectrum (in CHCl₃)
3320cm⁻¹(imino)
2220cm⁻¹(nitril)
1635cm⁻¹(imino)
Nuclear magnetic resonance spectrum (in CDCl₃)
1.9 (6H, br.s.) CH₂—CH₂—CH₂—CH₂—CH₂
3.0 (2H,m)

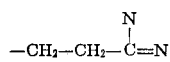

4.5 (2H,m) —CH₂—CH₂—N
7.7 (1H,S)

EXAMPLE 20

In 3 ml. of ethanol is dissolved 70 mg. of metallic sodium, followed by addition of 0.6 g. of acetic acid salt of 2-phenyl-7-amino-3,4,5,6-tetrahydro-2H-azepine and 0.52 g. of ethyl ethoxymethylenemalonate. The mixture is refluxed for 28 hours and concentrated in vacuo. The residue is dissolved in a mixture of methylene chloride and ether (1:4 by volume) and the organic layer is extracted with 10% hydrochloric acid. The aqueous layer is washed with a mixture of methylene chloride and ether (1:4 by volume), made alkaline with sodium carbonate and extracted with a mixture of methylene chloride and ether (1:4 by volume). The organic layer is dried over anhydrous sodium sulfate and the solvent is removed in vacuo. The residue is recrystallized from ether to give 0.1 g. of crystals. Recrystallization from ether gives 3-ethoxy-carbonyl-6-phenyl-7,8,9,10-tetrahydro-pyrimido-[1,2a]-azepin-4(6H)-one melting at 125°-128°C.
Infrared spectrum (in CHCl₃)
1740cm⁻¹(carbonyl of ester)
1680cm⁻¹(carbonyl of amide)
Nuclear magnetic resonance spectrum (in CDCl₃)
1.4 (3H, t, J=7cps) CH₃—CH₂—
4.4 (2H, g, J=7cps) CH₃—CH₂—O—
7.5–6.9 (5H,m)

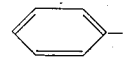

8.6 (1H,s)

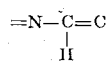

EXAMPLE 21

In 1 ml. of ethanol is dissolved 0.3 g. of 2-ethoxy-6-methyl-3,4,5,6-tetrahydropyridine and 0.46 g. of ethyl aminomethylenemalonate and the solution is heated at 130°-150°C in a sealed tube for 10 hours. The reaction mixture is concentrated and the residue is dissolved in 6% hydrochloric acid. The solution is washed with ether, made alkaline with sodium carbonate and extracted with ether. The ether layer is dried over anhydrous sodium sulfate and the solvent is removed in vacuo to give 0.21 g. of the residue. The residue is dissolved in a mixture of chloroform and ethyl acetate (1:1 by volume) and purified by columnchromatography on silica gel. 90 mg. of the product obtained is further purified in a similar columnchromatography to give 40 mg. of 3-ethoxycarbonyl-4-oxo-6-methyl-6,7,8,9-tetrahydro-4H-pyrido[1,2a]-pyrimidine. The product is identified with an anthentic sample in infrared and nuclear magnetic resonance spectra. The picrate melts at 150°-152°C and no depression is shown in the mixed melting point with an authentic sample.

EXAMPLE 22

A mixture of 1.5 g. of 2-ethoxy-3,4,5,6,7,8-hexahydro-azocine, 0.8 g. of ammonium acetate, 2.1 g. of ethyl ethoxymethylenemalonate and 3 ml. of ethanol is refluxed for 9.5 hours. The solvent is removed in vacuo and the residue is dissolved in 6% hydrochloric acid. The solution is washed with ether, made alkaline with sodium carbonate and extracted with chloroform. The chloroform layer is dried over anhydrous sodium sulfate. The solvent is removed in vacuo to give 1.4 g. of 3-ethoxycarbonyl-6,7,8,9,10,11-hexahydro-pyrimido-[1,2a]-azocin-4-one as oil. The picrate melts at 190°–193°C (with decomposition.

Elemental analysis: $C_{19}H_{21}N_5O_{10}$;
Calculated: C 47.60, H 4.42, N 14.61;
Found: C 47.42, H 4.28, N 14.33.

What is claimed is:

1. A process for producing a compound of the formula

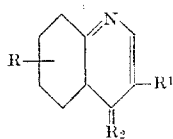

wherein $R^1$ is CN or alkoxycarbonyl, $R^2$ is NH or oxo, and R is lower alkyl, which comprises reacting a compound of the formula

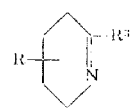

wherein $R^3$ is alkoxy and R is as defined above, with a compound of the formula

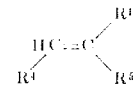

wherein $R^4$ is alkoxy, $R^5$ is CN or alkoxycarbonyl and $R^1$ is as defined above with the provisos that A. when $R^1$ and $R^5$ are CN, $R^2$ is NH B. when $R^1$ and $R^5$ are both alkoxycarbonyl groups, $R^2$ is oxo, and C. when $R^1$ and $R^5$ are different groups from one another, $R^1$ is CN, $R^5$ is alkoxycarbonyl and $R^2$ is oxo, in the presence of ammonia or an ammonia-producing substance.

2. The process as in claim 1, wherein $R^1$ is alkoxycarbonyl, $R^2$ is oxo, $R^3$ and $R^4$ are alkoxy, $R^5$ is alkoxycarbonyl and R is lower alkyl.

3. The process as in claim 1, wherein an inorganic ammonium salt is employed as the ammonia-producing substance.

4. The process as in claim 1, wherein $R^1$ is ethoxycarbonyl, $R^2$ is oxo, $R^3$ is ethoxy, $R^4$ is ethoxy, $R^5$ is ethoxycarbonyl and R is methyl substituted at 6-position and ammonium acetate is employed as the ammonia-producing substance.

* * * * *

UNITED STATES PATENT OFFICE
CERTIFICATE OF CORRECTION

Patent No. 3,853,871  Dated December 10, 1974

Inventor(s) Isao Agata, Shinsaku Noguchi and Kunihiro Tanaka

It is certified that error appears in the above-identified patent and that said Letters Patent are hereby corrected as shown below:

Claim 1, rewrite the structure of formula I as:

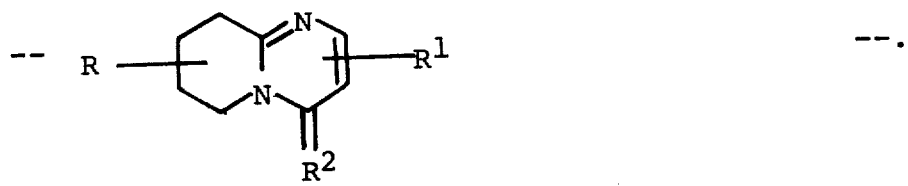

Signed and Sealed this

Tenth Day of August 1976

[SEAL]

Attest:

RUTH C. MASON
Attesting Officer

C. MARSHALL DANN
Commissioner of Patents and Trademarks